United States Patent [19]
Ferbas

[11] Patent Number: 5,162,617
[45] Date of Patent: Nov. 10, 1992

[54] WATERPROOF ELECTRICAL WIRE-UNIT JUNCTION COVER

[75] Inventor: Dennis K. Ferbas, Titasville, Fla.

[73] Assignee: Ocean Design, Inc., Holly Hill, Fla.

[21] Appl. No.: 597,530

[22] Filed: Oct. 15, 1990

[51] Int. Cl.$^5$ ............................................. H01B 17/00
[52] U.S. Cl. .................................. 174/138 F; 174/91; 174/87
[58] Field of Search ................... 174/52.3, 74 R, 74 A, 174/76, 77 R, 87, 91, 93, 138 F; 439/367, 521, 523, 587, 588, 892; 200/302.1

[56] References Cited

U.S. PATENT DOCUMENTS

| | | | |
|---|---|---|---|
| 3,209,069 | 9/1965 | Ruddell et al. | 174/138 F |
| 3,518,600 | 6/1970 | Urani | 174/91 X |
| 3,806,630 | 4/1974 | Thompson et al. | 174/87 X |
| 3,874,760 | 4/1975 | Guthmiller et al. | 174/91 X |
| 4,963,700 | 10/1990 | Olsen et al. | 174/138 F |

FOREIGN PATENT DOCUMENTS

| | | | |
|---|---|---|---|
| 643715 | 6/1962 | Canada | 174/65 G |
| 713597 | 9/1966 | Italy | 174/138 F |
| 175828 | 6/1961 | Sweden | 174/74 A |

*Primary Examiner*—Leo P. Picard
*Assistant Examiner*—Trinidad Korka

[57] ABSTRACT

A waterproof wire-sockets electrical junction cover suitable for use in wet environments includes a chamber to house the wire-sockets electrical junction. Sealable passages on one end of the chamber allow electrical wires to pass into the chamber. On the other chamber-end, a sealable port allows the wire-sockets itself to enter the chamber. The electrical wires are mechanically and electrically joined using the wire-sockets. The resulting junction is then drawn through the aforementioned sealable port into the chamber. The port is closed, thereby completely watertight sealing the wire-sockets electrical junction.

1 Claim, 2 Drawing Sheets

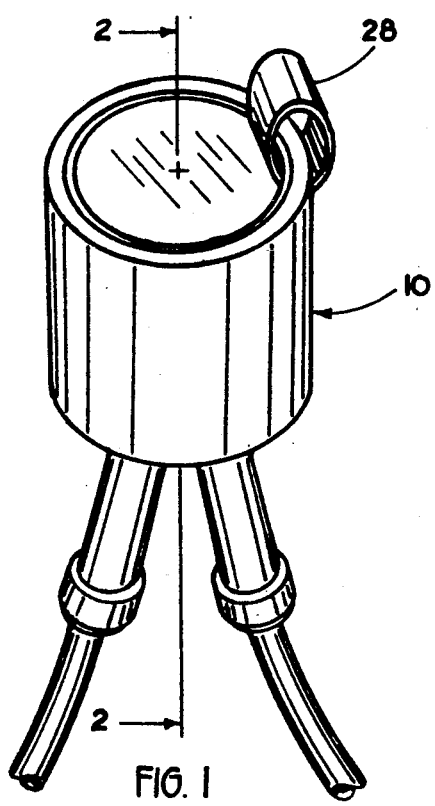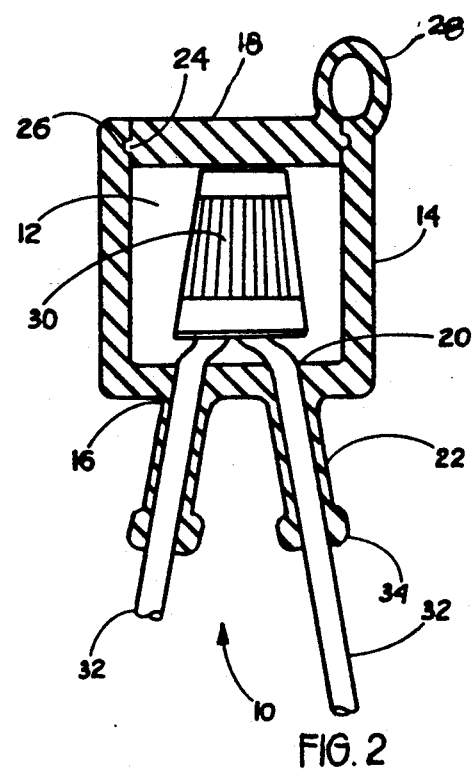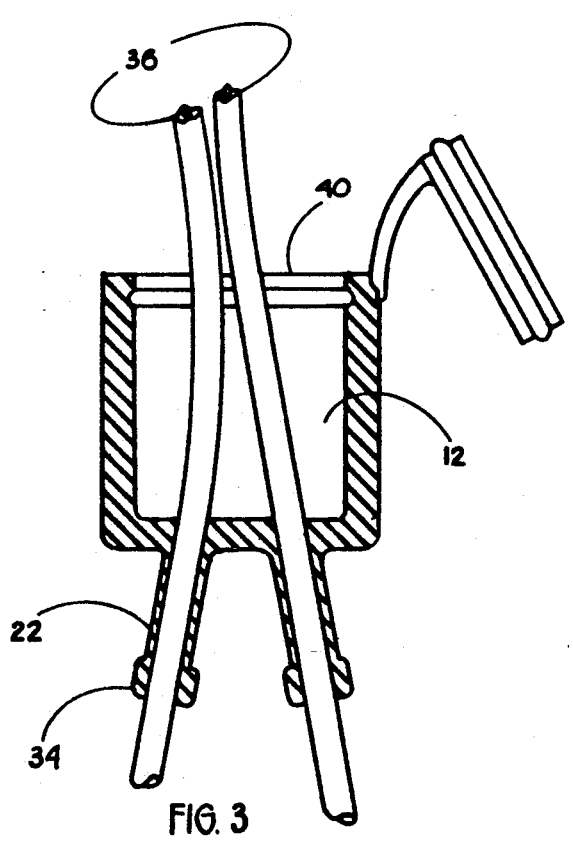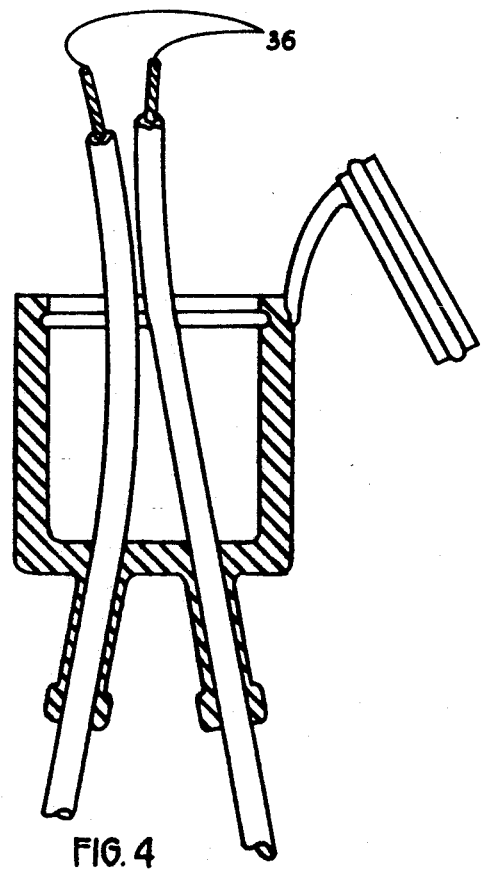

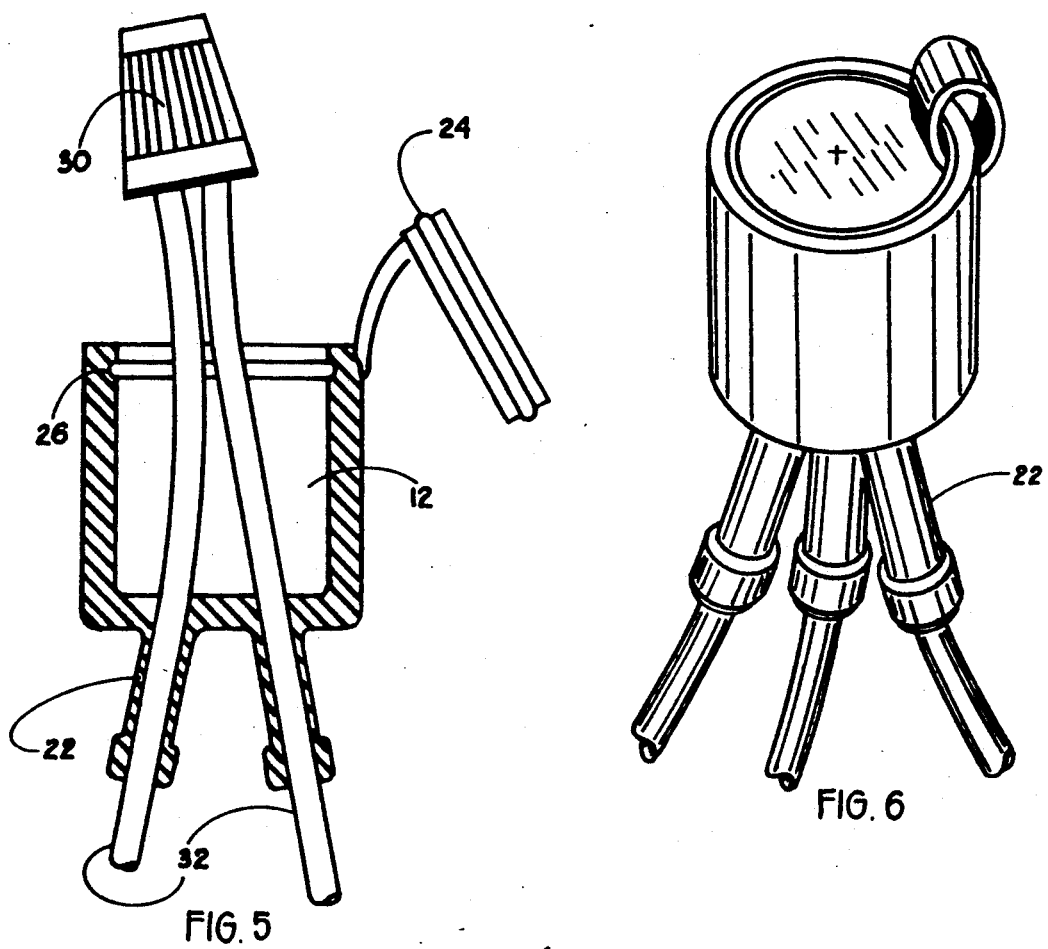
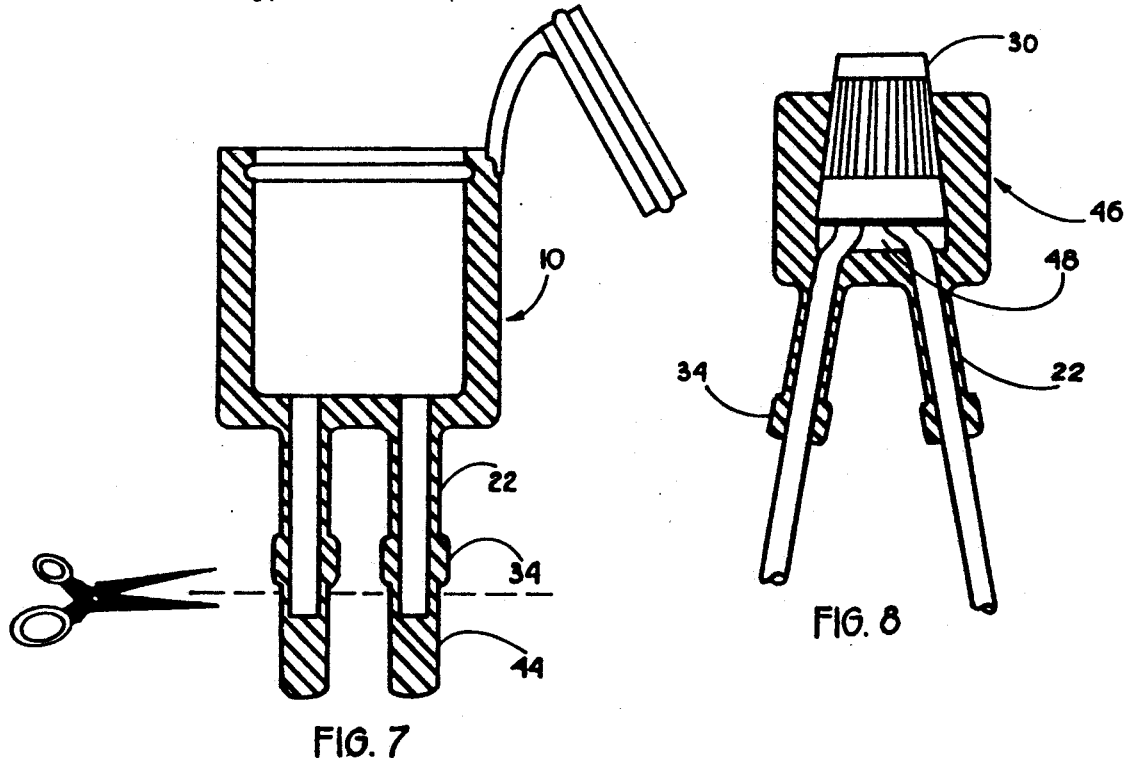

WATERPROOF ELECTRICAL WIRE-UNIT JUNCTION COVER

BACKGROUND OF THE INVENTION

This invention concerns a cover that seals and protects electrical junctions made using wire-sockets from their outside environment. Wire-sockets are connecting devices used to join two or more wires together in an electrically insulated junction. They are widely used in household wiring, and for wiring in many other environments. A wire-sockets generally consists of a fristo-conical plastic body penetrated in one end by a conical bore. The bore houses a corresponding spring-wire helix which fits conformally to the interior surface of the bore, and which is fixed within the bore. In operation, two or more were ends from which the insulation has been stripped are forced into the bore, and hence into the wire helix. The wire ends are firmly held fixed while the nut is rotated in the direction that advances them into the helix. The spiral spring-wire of the helix acts as an engaging thread. When the wire-sockets is thus tightened into place, the wire ends to be connected are both electrically and mechanically joined by the wire helix acting within the bore of the socket.

The insulation of the wire protects it from electrical contact with other objects up to the point where it enters the socket, and the plastic socket itself similarly protects the stripped wire ends now contained within it from contact with the outside environment.

In this system, however, there is no protection against moisture entering the interior of the socket, and thereby allowing electrical leakage through the moisture to the outside environment. In the case of actual submersion or bathing of the socket in water, a complete electrical short-circuit may occur. Since wire-sockets are often used in damp or wet environments such as for outdoor signs, outdoor lighting, waterpump motors and so on, one often sees wire-sockets junctions wrapped with electrical insulating tape or imbedded in insulating putty in an attempt to waterproof them. But these make-do remedies are fairly difficult to apply, and are frequently neither effective nor permanent. One problem is that many popular wire types have insulating jackets made of materials such as polyethylene or polytetrafluoroethylene, to which adhesives do not adhere well. So in these cases, the above sealing methods do not form a truly watertight seal against the wire. Still another disadvantage of these traditional means of sealing wire-sockets junctions is that if the junction needs to be undone temporarily, or needs to be inspected, said means are often difficult to clean off of the junction. And then, once removed, new material must be used to replace the protection.

There is a need, therefore, for a systematic means to reliably seal wire-sockets electrical junctions from their outside environment in all circumstances. The invention herein described addresses that need. Its principal objective is to provide a simple and effective means of permanently waterproofing wire-sockets junctions, even in the event that such junctions are completely submerged in water. A second objective is to provide such a protective means which may be used equally well on wires with all types of jacket materials. Still another objective is to provide such a protective means that may be easily opened and removed for inspection of the enclosed junction, and then reinstalled for continued protection.

SUMMARY OF THE INVENTION

The present invention takes advantage of a sealing technique utilized in the construction of deep-sea electrical connectors. The technique is a method to seal against smooth elongated objects, in this case the of the wire insulation, using low-stress seals which are sometimes referred to as "sleeve-seals". These seals consist of elastomeric sleeves through which the smooth-jacketed wires extend. The sleeves have an inner diameter slightly smaller than the outer diameter of the of the wire jacket. As a wire passes through one of these sleeves, the sleeve is stretched radially by the wire, so that the sleeve is held in tension against a length of the wire jacket's surface. Such devices are well known to form effective mechanical seals which improve with increasing water pressure. Since they don't depend on any property of the jacket other than a smooth surface finish they may be used on wires with all types of insulating jackets. Such seals are employed in the present invention.

In the wire-sockets junction cover now summarized the electrical junction, comprised of the wire-sockets and the connected wire ends contained therein, are housed within a chamber which has a sealable opening, such as a port sealed by a removable end-cap, on one end. The other chamber-end is perforated by openings leading through elastomeric sleeves which extend outward from the chamber. The connected wires pass from the chamber through said openings and said sleeves and on to the outside environment. The sleeves seal against the jackets of the wires that pass through them. The sealable opening on one chamber-end and the sleeve-seals on the other chamber-end, in combination, seal the wire-sockets junction within the chamber. Said sealable opening on one chamber-end is large enough to allow the wire-sockets to pass thru it, so that the wire-sockets junction may be installed, removed and reinstalled easily without damage to the protective cover. Because both the sealable end-opening and the sleeve-seals are mechanical seals that do not depend upon adhesion, the invented protective-cover may be used on wires with all types of insulating jackets.

The summarized invention, therefore, achieves the stated objective of systematically sealing wire-sockets junctions from their outside environment. It further fulfills the objectives of being removable and reusable, and functioning equally well with wires having all types of insulating jackets.

The achievement of these and other objectives and advantages of the invented wire-sockets electrical junction cover will be better understood when the following detailed description of the invention is read with reference to the next-summarized illustrations, in which:

FIG. 1 is an oblique view of a wire-sockets electrical junction cover installed for the application of protecting the junction of two wires;

FIG. 2 is a sectional view taken along 2—2 of FIG. 1;

FIGS. 3–5 are views similar to that of FIG. 2 illustrating the installation sequence of a wire-sockets electrical junction cover for the application of protecting the junction of two wires;

FIG. 6 is a side elevation view showing a wire-sockets electrical junction cover in a three-wire installation;

FIG. 7 is a sectioned side-elevation view of a wire-sockets electrical junction cover showing how such a cover of a particular design may be used for applications involving various numbers of wires; and FIG. 8 is a sectioned side-elevation view of an embodiment of the wire-sockets electrical junction cover that uses the wire-sockets itself as the sealing end-cap.

DETAILED DESCRIPTION OF THE PREFERRED EMBODIMENT

FIG. 1 is an oblique view of the invented wire-sockets electrical-junction cover installed for the application of protecting the junction of two wires.

FIGS. 2–5 illustrate the structure and operation of the invented wire-sockets electrical junction cover. Wire-sockets 30 is contained in protective cover 10 within an internal chamber 12, defined by side-wall 14, end-wall 16, and end-cap 18. End-wall 16 is perforated by openings 20 which lead out through sleeves 22. End-cap 18 is sealably held in its closed position by one or more circular nibs 24 which extend around its circumference and collaborate with one or more corresponding mating grooves 26 to both retain the end-cap in the closed position and to seal the cover. Retainer strap 28 keeps the end-cap from going astray when the cap is in the open position. Wires 32 extend from their junction within wire-sockets 30 out through openings 20 and thence sealably through sleeves 22 to the outside environment. Sleeves 22 terminate in larger diameter cuffs 34 which prevent tearing of the relatively thin-walled sleeves during rough handling. Thus described it is clear that the wire-sockets electrical junction is effectively sealed from the outside environment by the invented protective cover.

To those practised in the field of elastomer molding it will also be evident that the entire cover comprising end-cap 18, retaining strap 28, walls 14 and 16, and sleeves 22 with cuffs 34 can be molded as a single integral part.

The installation sequence of the protective cover is as follows. FIG. 3 illustrates wire ends 36 which have been threaded through the cuff-ends 34 of sleeves 22 and then pass completely through chamber 12 via port 40. Threading is facilitated by the addition of a bit of dielectric grease to the wire-ends prior to their insertion. The next step, shown in FIG. 4, is to strip the insulating jacket from a short portion of the wire ends 36. As indicated in FIG. 5, the next step is to connect the wire ends with wire-nut 30. Thus connected, the wires 32 are drawn back through sleeves 22, thereby pulling the wire-sockets into chamber 12 in the position in which it is shown in FIG. 2. As is also indicated in FIG. 2, cap 18 is then pressed into its closed position, thereby engaging nib 24 into groove 26, sealing the wire-sockets junction within chamber 12. Installation of the wire-sockets electrical junction protective cover is now complete.

Thus far, for simplicity, discussion of the invented protective cover has been for the application in which only two wires are joined by the wire-sockets. There are applications, however, in which three or even four wires are joined within a single wire-sockets. FIG. 6 illustrates that a wire-sockets protective electrical junction cover may be constructed for multiple-wire applications by including an appropriate number of sleeves 22 leading into the central chamber of said cover. The installation and operation of the multiple-wire junction cover shown in FIG. 6 are the same as in the previous two-wire junction example.

Since wire-sockets electrical junction protective covers may find use in applications involving various numbers of wires, it is useful to construct them so that a single cover may be employed in all such applications. FIG. 7 illustrates how this may be accomplished. Wire-sockets protective cover 10 is molded with any number of sleeves 22. However, these sleeves are molded with elongations 44 that are closed a bit beyond reinforcing cuffs 34. That is to say, the passage defining the interior of each sleeve extends from the chamber to a point just past the cuff of the sleeve, and then dead ends within elongations 44. In use, one snips off these elongations, as indicated in FIG. 7, as needed for the particular application at hand. The unused sleeves remain sealed by their closed elongations. Thus a single wire-sockets cover may be made to function in applications involving any number of wires.

DETAILED DESCRIPTION OF A SECOND EMBODIMENT

The wire-sockets electrical junction cover just described as the preferred embodiment of the invention functions equally well without regard to the particular size or shape of the wire-sockets. It is sufficient that the overall size of the wire-sockets not exceed the dimensions of the chamber of the invented protective cover into which it must fit. A simplification of the wire-nut cover design is possible, however, in the case that the cover is constructed to accommodate wire-sockets of known shape and dimensions.

FIG. 8 illustrates a modification of the previously described preferred embodiment which uses the wire-sockets itself as the end-cap which sealably closes one end of the wire-sockets electrical junction protective-cover. In FIG. 8, wire-sockets cover 46 is made of an elastomeric material formed to stretch over wire-sockets 30 sealably fitting around it. As in the description of the preferred embodiment, the cover 46 has sleeves 22 terminating in cuffs 34 that seal around the wires. The various components just described thus define sealed chamber 48 which houses and protects the actual electrical junction. The installation and operation of this embodiment of the invention are then obvious from the previous discussion of the installation and operation of the preferred embodiment, and the various options and advantages of the previously described preferred embodiment apply equally to this second embodiment.

Obviously, many other variations of the invention are possible in light of these teachings which, when employed, will not deviate from the scope of the appended claims.

Having thus described my invention I hereby claim:

1. A small device for providing a watertight seal around electrically connected ends of a plurality of electrical connectors and for protecting said electrically connected ends from the outside environment, comprising:
    a substantially cylindrical chamber having two ends,
    a first opening in the first end of said chamber,
    a plurality of openings in other end of said chamber,
    a plurality of sleeve-seals, with each of said sleeve seals being connected to one of said openings in said other end of said chamber,
    each of said sleeve-seals having a relatively long length of resilient like tubing through which insulated wires pass in communication with the internal volume of said chamber, said sleeve-seals resiliently contract in a sealing contact with the insulated surface of said insulated wires, through out the length of each sleeve seal, each of said sleeve-seals having on the ends opposite the connection to said chamber, enlarged cylindrical portions for resiliently gripping the outer insulated surface of the insulated wires, at least one circular groove in said chamber adjacent the first opening, a resilient end-cap plug having at least one resilient nib around its outer cylindrical surface, said end-cap being insertable into the first open end of the chamber, a flexible connector connecting said end-cap to said chamber, said end-cap when in said first opening, is sealably retained in said first opening by a resilient compression between the outer surface of said end-cap and the inner surface of said chamber and by the inner mating of said nibs with said grooves, said chamber having only sufficient volume to interconnect the ends of said electrical connectors within said chamber volume, and said end-cap being selectively removable from said first opening by grasping said flexible connector and pulling said connector to pull said end-cap out of said opening allowing inspection of said electrical connection and reinsertion of said end-cap into said first opening.

* * * * *